US009569857B2

(12) United States Patent
Rozzi et al.

(10) Patent No.: US 9,569,857 B2
(45) Date of Patent: Feb. 14, 2017

(54) CONVERSION OF DIGITAL IMAGES INTO DIGITAL LINE DRAWINGS

(71) Applicant: ReallyColor, LLC, Chicago, IL (US)

(72) Inventors: William A. Rozzi, Collierville, TN (US); Dieter T. Marlovics, Glenview, IL (US); Matthew N. Klein, Chicago, IL (US)

(73) Assignee: ReallyColor, LLC, Chicago, IL (US)

( * ) Notice: Subject to any disclaimer, the term of this patent is extended or adjusted under 35 U.S.C. 154(b) by 140 days.

(21) Appl. No.: 14/478,068

(22) Filed: Sep. 5, 2014

(65) Prior Publication Data

US 2015/0063710 A1    Mar. 5, 2015

Related U.S. Application Data

(60) Provisional application No. 61/874,086, filed on Sep. 5, 2013.

(51) Int. Cl.
*G06K 9/00* (2006.01)
*G06T 7/00* (2006.01)
*G06T 11/20* (2006.01)

(52) U.S. Cl.
CPC .......... *G06T 7/0085* (2013.01); *G06T 11/203* (2013.01); *G06T 2207/20036* (2013.01); *G06T 2207/20148* (2013.01); *G06T 2207/20192* (2013.01)

(58) Field of Classification Search
CPC ................. G03F 1/44; G06T 7/0079–7/0097; G06T 11/203; G06T 2207/20036; G06T 2207/20148; G06T 2207/20192; G06T 2207/20044
See application file for complete search history.

(56) References Cited

U.S. PATENT DOCUMENTS

| 4,710,813 A * | 12/1987 | Wallis ................ H04N 19/61 375/240.13 |
| 6,356,274 B1 * | 3/2002 | Spector .............. G06T 11/001 345/589 |
| 6,650,774 B1 * | 11/2003 | Szeliski ............... G06T 5/008 348/225.1 |

(Continued)

FOREIGN PATENT DOCUMENTS

GB            341811            1/1931

OTHER PUBLICATIONS

Wiegand, T. Multi-Frame Motion-Compensated Prediction for Video Transmission—Draft. Boston, Kluwer Academic Publishers, May 23, 2001. pp. i-xxii and 1-150.

*Primary Examiner* — Aaron W Carter
(74) *Attorney, Agent, or Firm* — Fogg & Power LLC

(57) ABSTRACT

Techniques described herein convert digital images into images suitable for use as coloring book pages and the like. The techniques include applying a smoothing operator to at least one channel image of a digital input image to form at least one smoothed image. A scaling operator is then applied to the at least one smoothed image to form at least one scaled image. A tone equalization operator is then applied to the at least one scaled image to form at least one equalized image. An edge detection operator is then applied to the at least one scaled image to form at least one edge image. In addition, a threshold operator is applied to the at least one edge image to form at least one threshold image. A digital line drawing is then created based at least in part on the at least one threshold image.

20 Claims, 5 Drawing Sheets

(56) References Cited

U.S. PATENT DOCUMENTS

| | | | | |
|---|---|---|---|---|
| 8,411,986 B2* | 4/2013 | Ip | G06K 9/38 | 382/173 |
| 8,554,005 B1* | 10/2013 | Majewicz | G06T 5/008 | 358/296 |
| 9,289,191 B2* | 3/2016 | Clingman | A61B 5/0095 | |
| 2005/0001854 A1* | 1/2005 | Schuster | G06T 11/001 | 345/639 |
| 2005/0151841 A1* | 7/2005 | Nelson | G01N 21/954 | 348/82 |
| 2005/0163371 A1* | 7/2005 | Nystrom | G06T 5/007 | 382/168 |
| 2008/0284791 A1* | 11/2008 | Bressan | G06K 9/4638 | 345/589 |
| 2008/0285853 A1* | 11/2008 | Bressan | G06T 5/009 | 382/169 |
| 2009/0196501 A1* | 8/2009 | Ma | G06K 9/38 | 382/169 |
| 2009/0268973 A1* | 10/2009 | Majewicz | G06T 5/40 | 382/237 |
| 2010/0061629 A1* | 3/2010 | Ma | G06K 9/38 | 382/169 |
| 2010/0061655 A1* | 3/2010 | Ma | G06K 9/40 | 382/275 |
| 2010/0316288 A1* | 12/2010 | Ip | G06K 9/38 | 382/164 |
| 2011/0148897 A1* | 6/2011 | Wong | G06T 11/001 | 345/582 |
| 2012/0070041 A1* | 3/2012 | Wang | G06F 21/32 | 382/118 |
| 2014/0016861 A1* | 1/2014 | Houjou | G06T 11/00 | 382/162 |
| 2014/0233826 A1* | 8/2014 | Agaian | A61B 5/7267 | 382/133 |
| 2014/0282624 A1* | 9/2014 | Holt | G06F 9/542 | 719/318 |
| 2014/0294291 A1* | 10/2014 | Zhang | G06K 9/00818 | 382/159 |
| 2014/0355887 A1* | 12/2014 | Kurosawa | G06T 7/0083 | 382/199 |
| 2015/0063708 A1* | 3/2015 | Sripadarao | G06K 9/00228 | 382/199 |
| 2015/0063710 A1* | 3/2015 | Rozzi | G06T 7/0085 | 382/199 |
| 2015/0098617 A1* | 4/2015 | Choiniere | G01C 15/00 | 382/103 |

* cited by examiner

CONVERSION OF DIGITAL IMAGES INTO DIGITAL LINE DRAWINGS

CROSS-REFERENCE TO RELATED APPLICATIONS

This Application claims priority to and benefit from U.S. Provisional Application Ser. No. 61/874,086, same title herewith, filed on Sep. 5, 2013, which is incorporated in its entirety herein by reference.

TECHNICAL FIELD

The disclosure relates to processing of digital images and, more particularly, to conversion of digital images into digital line drawings.

BACKGROUND

People of all ages enjoy coloring, paint by numbers, and other forms of entertainment having line drawings as an essential element. Digital line drawings are digital images that are similar in appearance to traditional line drawings. Digital line drawings may be characterized by a substantially bimodal distribution of pixel values, with pixels close in value to one mode being associated with the lines and pixels close to the other mode forming the background.

Universal adoption of digital cameras, as dedicated gadgets or as incorporated within multi-function devices such as cellular phones, has led to widespread availability of digital images. Consumers may wish to convert their digital images into digital line drawings to allow painting or coloring of personal subject matter. The ability to capture memories or special events in this way makes for a more interesting and engaging experience and end product, especially for children.

Straightforward and simple methods of producing digital line drawings from digital images involve application of an edge detection operator to the digital image, followed by a threshold operation. These steps may be effectively carried out in many popular image editing computer programs such as Adobe Photoshop™. Application of such straightforward methods, however, can produce digital line drawings with noise, loss of key elements from the scene, or excessive detail that limits the usefulness of the result for coloring or painting purposes. The present invention improves upon these simple methods and may reduce noise, eliminate excessive detail, and preserve scene elements that are essential for a good coloring page.

For the reasons stated above and for other reasons stated below which will become apparent to those skilled in the art upon reading and understanding the present specification, there is a need in the art for an effective and efficient method to produce high quality digital drawings from digital images.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one example embodiment, a method for converting a digital image into a digital line drawing is provided. The method includes applying a smoothing operator to at least one channel image of a digital input image to form at least one smoothed image. A scaling operator is then applied to the at least one smoothed image to form at least one scaled image. A tone equalization operator is then applied to the at least one scaled image to form at least one equalized image. An edge detection operator is then applied to the at least one scaled image to form at least one edge image. In addition, a threshold operator is applied to the at least one edge image to form at least one threshold image. A digital line drawing is then created based at least in part on the at least one threshold image.

In another example embodiment, another method for converting a digital image into a digital line drawing is provided. The method includes receiving an input image with a plurality of input channels. A blank accumulator image is formed from the input image. For a subset of the plurality of input channels the method further includes: forming a single channel image from one of the input channels in the subset; applying a smoothing operator to the single channel image to obtain a smoothed image; applying a scaling operator to the smoothed image to obtain a scaled image; applying a tone equalization operator to the scaled image to obtain an equalized image; applying an edge detection operator to the equalized image to obtain an edge image; applying a threshold operator to the edge image to obtain a thresholded image; combining the thresholded image with the accumulator image; and providing the accumulator image as the digital line drawing.

In another example embodiment, yet another method for converting a digital image into a digital line drawing is provided. The method includes receiving an input image with at least one channel. A combination of at least one channel of the input image is formed to obtain a single channel image. A smoothing operator is applied to the single channel image to obtain a smoothed image. A scaling operator is applied in turn to the smoothed image to obtain a scaled image. A tone equalization operator is applied to the scaled image to obtain an equalized image. An edge detection operator is applied to the equalized image to obtain an edge image. A threshold operator is applied to the edge image to obtain a threshold image. The threshold image is provided as the digital line drawing.

The details of one or more aspects of the disclosure are set forth in the accompanying drawings and the description below. Other features, objects, and advantages of the disclosure will be apparent from the description and drawings, and from the claims.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a computing device to convert a digital image into a digital line drawing. A digital image may be represented as one or more two-dimensional arrays of digital values called picture elements, more commonly referred to as pixels. Each two-dimensional pixel array comprising the digital image may be called a component or a channel. An image with one channel is often referred to as a grayscale image. Three channels may represent color images, for example an RGB image, comprised of one channel for each of a red, green, and blue component. Other representations are also possible, including CMYK, for cyan, magenta, yellow, and black components.

Figure 1:
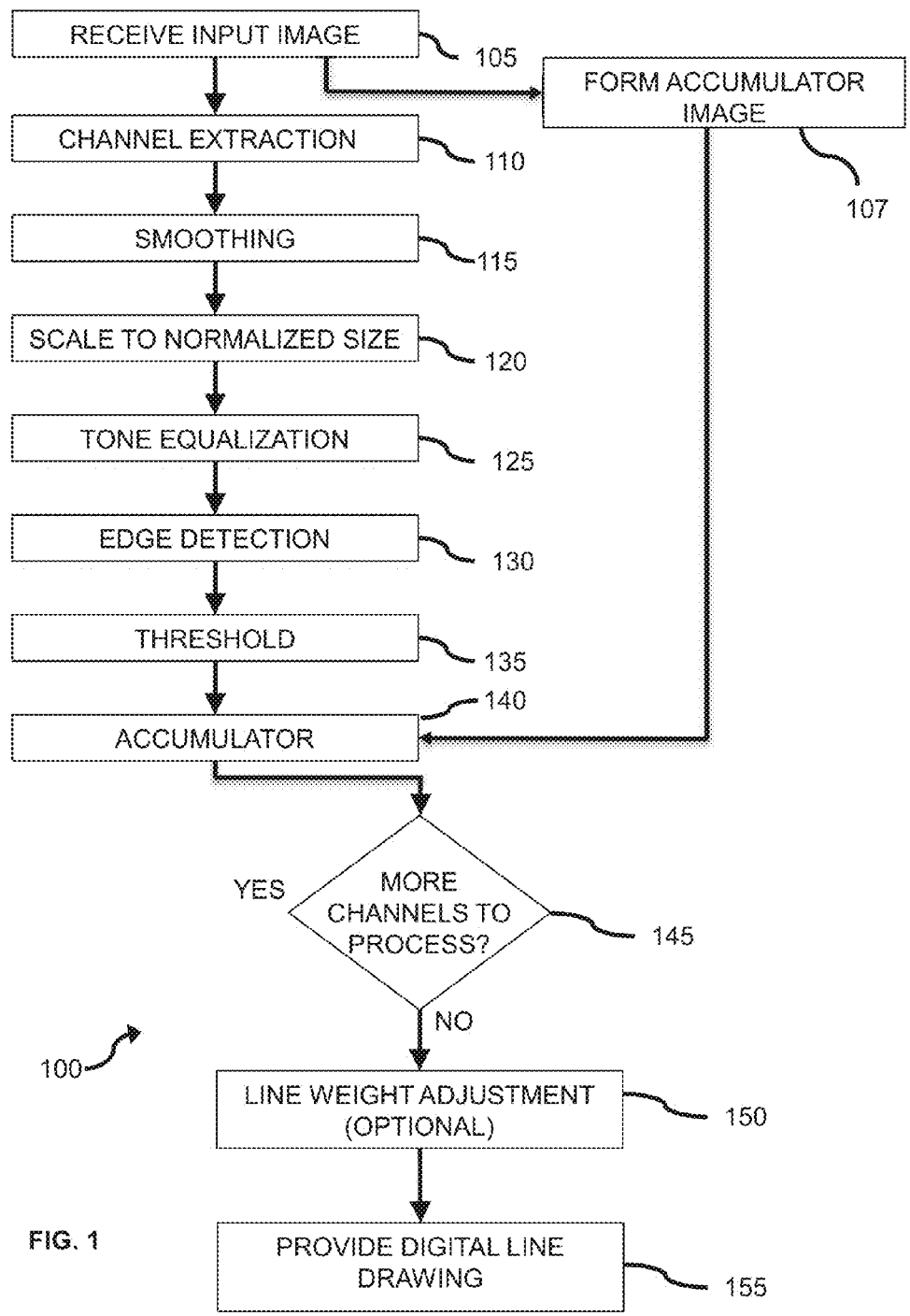
FIG. 1 is a flow chart illustrating a method of converting a digital image into a digital line drawing in accordance with one or more aspects of an embodiment of the present disclosure.

FIG. 1 is a flow chart illustrating an example method 100 that may be performed by a computing device to convert a digital image into a digital line drawing, in accordance with one or more aspects of the present disclosure. For example, method 100 may be performed by computing device 2 shown in FIG. 5.

Method 100 includes receiving a digital input image (105) to be converted into a digital line drawing, wherein the input image has at least one channel. An accumulator image (107) used in connection with accumulator (140) is formed and initialized with uniform pixel values. In particular, in one embodiment the accumulator image (107) is formed by allocating a block of computer memory sufficient to hold an image with the required dimensions and bit depth. For example, if it is necessary to form a 16-bit accumulator image with dimensions 1920 pixels wide by 1080 pixels high, then 1920×1080×2=4147200 bytes of memory would be allocated to hold the accumulator image; the extra factor of 2 is because 1 byte=8 bits, and 16-bits per pixel was specified in our example. Once the accumulator image (107) is formed, as discussed above, its pixels are initialized to a constant value such as zero. In the method 100 of FIG. 1, a subset of the input image channels are each extracted in turn (110) and provided to a core image processing pipeline comprised of the following sequence of operations: smoothing (115), scaling to a normalized size (120), tone equalization (125), edge detection (130), and application of a threshold (135). The intermediate image output by threshold step (135) is combined with the accumulator image in the accumulator (140). Step (145) determines whether any channels from the aforementioned subset of input channels remain to be processed. If so, flow returns to channel extraction (110). If not, line weight adjustment (150) is optionally applied to the accumulator image, and the line weight adjusted image is provided as the digital line drawing (155). Steps (110), (115), (120), (125), (130), (135), (140), and (150) will be discussed in greater detail below.

Core image processing pipeline steps (115), (120), (125), (130), and (135) are performed on a single channel image. Channel extraction (110) identifies a subset of the digital input image channels to be processed by the core image processing pipeline. Notably, the subset may contain one, several, or all channels of the input image. For example, all three channels of an RGB image may be included in the subset. In another example, because the blue channel of images produced by digital cameras frequently exhibits noise levels higher than that of the red and green channels the subset may contain only the red and green channels.

Each channel image in the subset of input channels is smoothed by a smoothing operator (115) to reduce noise. The smoothing operator may be one of or a combination of well-known techniques such as Gaussian blur, box blur, and median filtering. Smoothing may be achieved by a single application of these techniques, or by iterative (i.e., repeated) application of these techniques. For example, the smoothing operator may be an iterative application of a 3×3 median filter, with a fixed or variable number of iterations. With repeated application of a median filter, the filtered image eventually converges, that is, subsequent applications of the filter do not result in any changes to the image. Pictoric images typically exhibit little change after 10 iterations of a 3×3 median filter. Furthermore, an iterated median filter may preserve boundary sharpness, which is advantageous for the present invention.

The smoothed image as output by step (115) is scaled to a normalized size (120). The two-dimensional array representing a digital image has a number of pixels along one dimension, called the width, and another number of pixels along the other dimension, called the height. The two numbers, width and height, are collectively referred to as the size of the image. A normalized size may be defined as a size where the width or height equal a specific value. A normalized size may be alternately defined as a size where both width and height equal specific values. Step (120) therefore involves an image resizing operation that accepts the input image channel being processed and resizes it to the normalized size. For example, normalized size may be defined as a size where the maximum of the width or height of an image must be 1500 pixels. If the input image channel has a width of 4500 and a height of 2100, the resulting normalized image size would have a width of 1500 (=4500*1500/4500) pixels and a height of 700 (=2100*1500/4500), where the scale factor 1500/4500 has been selected so that the resized width equals the specified value of 1500. An image having a normalized size equal to its original size may skip the actual resizing computation, but it is still considered to be a scaled image at the end of step (120).

The scaled image as output by step (120) is processed by a tone equalization operator (125). Tone equalization may substantially reduce range of pixel values in an image which can improve the results of the subsequent operations in the image processing pipeline. For example, if an image that is mostly dark but with a small localized bright spot, such as an indoor scene with bright sunlight shining though a window, is processed without tone equalization, details in the dark regions may not show up in the converted image. Tone equalization may brighten these dark areas, preserving the details contained therein in the final result.

Options for tone equalization include none (a pass-through filter), local correction, histogram equalization, contrast-limited adaptive histogram equalization (CLAHE), and adjustable contrast function, among others. An adjustable contrast function, described in connection with FIG. 3 below, may provide a result comparable with more computationally expensive techniques like local correction or CLAHE.

An edge detection operator (130) is applied to the image output by the tone equalization operator (125). Edge detection operators such as Canny, Sobel, Difference of Gaussians (DoG), Laplacian, and others are well known in the area image processing. Some of these methods convert a given pixel in an image into a value that is proportional to the magnitude of pixel differences in a neighborhood around the location of the input pixel. Of these, Difference of Gaussians (DoG), which involves the subtraction of one blurred version of an image from another, less blurred version of the same image, may work particularly well in the context of the present disclosure. Other methods, such as the Canny operator, output a bi-level image with one level at the location of edge pixels and the other level at all other locations.

Many of the aforementioned edge detection methods produce an image where pixel value varies with the local strength of an edge. Since a substantially bimodal image is desired for the final digital line drawing, a threshold operator (135) is applied to the output of the edge detector operator 130. Threshold operators convert arbitrary pixel values into one of two levels, those that fall below some threshold value and those that lie above the threshold value. The threshold value may be a predetermined, fixed value, or it may be a fixed value determined through analysis of a given image, or it may be a value that varies depending on local properties of the image, as with so-called adaptive thresholds.

A threshold operator (135) that works well when converting digital images into digital line drawings is denoted herein as a fixed pixel percentage threshold operator. The fixed pixel percentage threshold operator performs a first analysis of the image to be thresholded to determine a threshold which, when applied to the image, results in a specified percentage of pixels above the threshold. This operator may be implemented based on a cumulative histogram of the pixel values in the image to be thresholded. From the cumulative histogram it is possible to identify a pair of adjacent threshold levels that produce above-threshold pixel percentages that bracket the targeted pixel percentage. Applying either one of these pair of adjacent threshold levels to the image may result in a bilevel image with the percentage of pixels above the threshold being close to the targeted value.

It is the responsibility of the accumulator (140) to combine the outputs of the threshold operator (135) produced by processing each channel from the subset of input channels that have passed through the core image processing pipeline steps (115), (120), (125), (130), and (135) into a single image having a substantially bimodal pixel value distribution. Starting with the uniform pixel value accumulator image (10) formed immediately after receiving the digital input image (105), the accumulator (140) combines each output from threshold operator (135) with accumulator image (107), wherein the combination process preserves the substantially bimodal nature of the threshold images. For example, if the images produced by the threshold operator (135) are bilevel images having, for purposes of illustration only, line pixels represented by binary level 1 and background pixels represented by binary level 0, the combination process may be implemented using a Boolean OR operation. In this way, after all input channels from the subset identified in channel extraction step (110) have been processed and combined, the accumulator image represents the union of line pixels produced by the core image processing for all of the subset channels.

After each input channel from the subset identified in channel extraction step (110) have been processed and combined into the accumulator image, decision step (145) determines whether any channels from the subset have not yet been processed. If unprocessed channels remain, flow returns to channel extraction step (110). Otherwise, the loop over channels in the subset ends and the accumulator image is provided to optional line weight adjustment operator 150.

Optional line weight adjustment operator (150) may be requested to add pixels to the perimeter of lines in the accumulator image, producing thicker lines in the digital line drawing. Alternately, optional line weight adjustment operator (150) may be requested to remove pixels from the perimeter of lines in the accumulator image, producing thinner lines in the digital line drawing. Clearly, skipping optional line weight adjustment operator (150) results in no change to line thicknesses in the accumulator image. The well-known morphological image processing operators, erosion and dilation, may be used to implement optional line weight adjustment operator (150). One or more iterations of an erosion operation produce thinner lines in an image, while one or more iterations of a dilation operation produce thicker lines in an image. In either case, the number of iterations determines the degree of thinning or thickening.

If optional line weight adjustment operator (150) is applied to the accumulator image, then the output of line weight adjustment operator (150) is provided as the digital line drawing (155). If optional line weight adjustment operator (150) is not applied to the accumulator image, then the accumulator image is provided as the digital line drawing (155).

Figure 2:
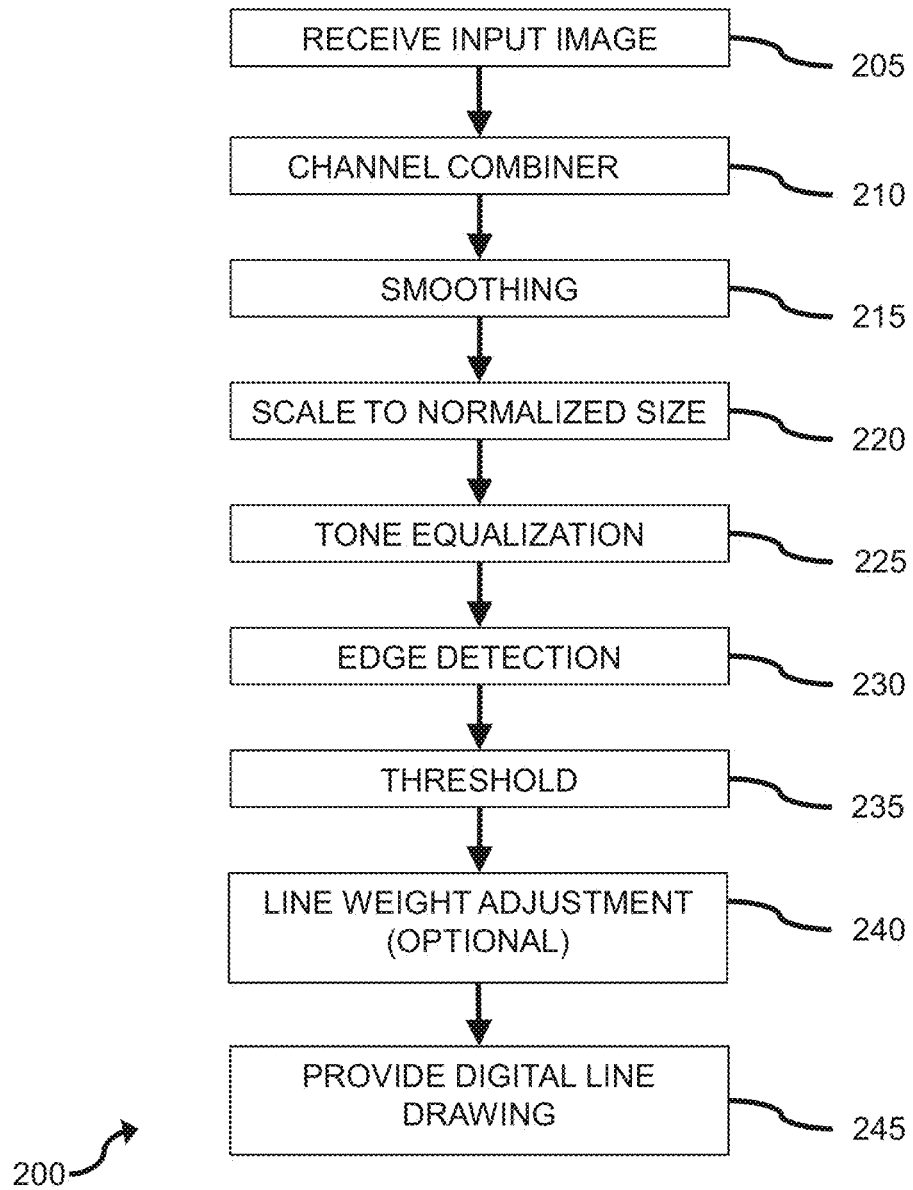
FIG. 2 is a flow chart illustrating a method of converting a digital image into a digital line drawing in accordance with one or more aspects of another embodiment of the present disclosure.

Referring to FIG. 2, a flow chart illustrating another example method 200 that may be performed by a computing device to convert a digital image into a digital line drawing, in accordance with one or more aspects of the present disclosure. For example, method 200 may be performed by computing device 2 shown in FIG. 5.

Method 200 includes receiving a digital input image (205) to be converted into a digital line drawing, wherein the input image has at least one channel. A single channel image is formed from weighted combination of at least one of the input image channels (210) and provided to a core image processing pipeline comprised of the following sequence of operations: smoothing (215), scaling to a normalized size (220), tone equalization (225), edge detection (230), and application of a threshold (235). Line weight adjustment (240) is optionally applied to the thresholded image, and the line weight adjusted image is provided as the digital line drawing (245). Steps (210), (215), (220), (225), (230), (235), and (240) will be discussed in greater detail below.

Method 200 includes receiving a digital input image (205) to be converted into a digital line drawing, wherein the input image has at least one channel. A single channel image is formed as a combination of at least one channel of the input image (210). For example, the single channel image may be formed as a weighted combination of the input channels according to the following equation:

$$S = \sum_{i=1}^{N} w_i C_i$$

where $C_i$ is the $i^{th}$ input channel, $w_i$ is the weight applied to the $i^{th}$ input channel, N is the number of input channels, and S is the resulting single channel image. For example, for an RGB image, S may be formed from the green channel alone by specifying the weights w={0, 1, 0}, that is, S=0*R+1*G+0*B. In another example, S may be formed as a luminance image using weights substantially similar to w={0.2126, 0.7152, 0.0722}, that is, S=0.2126*R+0.7152*G+0.0722*B. Luminance is the achromatic component of an image, which may be approximated as a weighted combination of the red, green, and blue channels where the weight applied to the green channel is the largest and the weight applied to the blue channel is the smallest. Other methods of forming a single channel image from at least one of the input channels, such as non-linear combinations, are also possible.

The single channel image formed by the channel combiner step (210) is provided to the core image processing pipeline, comprised of operations (215), (220), (225), (230), and (235). Each of these operations is equivalent to corresponding operations in the method 100 described above. Specifically, smoothing operator (215) is equivalent to smoothing operator (115), scaling operator (220) is equivalent to scaling operator (120), tone equalization operator (225) is equivalent to tone equalization operator (125), edge detection operator (230) is equivalent to edge detection operator (130), and threshold operator (235) is equivalent to threshold operator (135).

The threshold image as output by step (235) may be input to an optional line weight adjustment operator (240), which is equivalent to line weight adjustment operator (150). If optional line weight adjustment operator (240) is applied to the threshold image, then the output of line weight adjustment operator (240) is provided as the digital line drawing (245). If optional line weight adjustment operator (240) is not applied to the threshold image, then the threshold image is provided as the digital line drawing (245).

Figure 3:
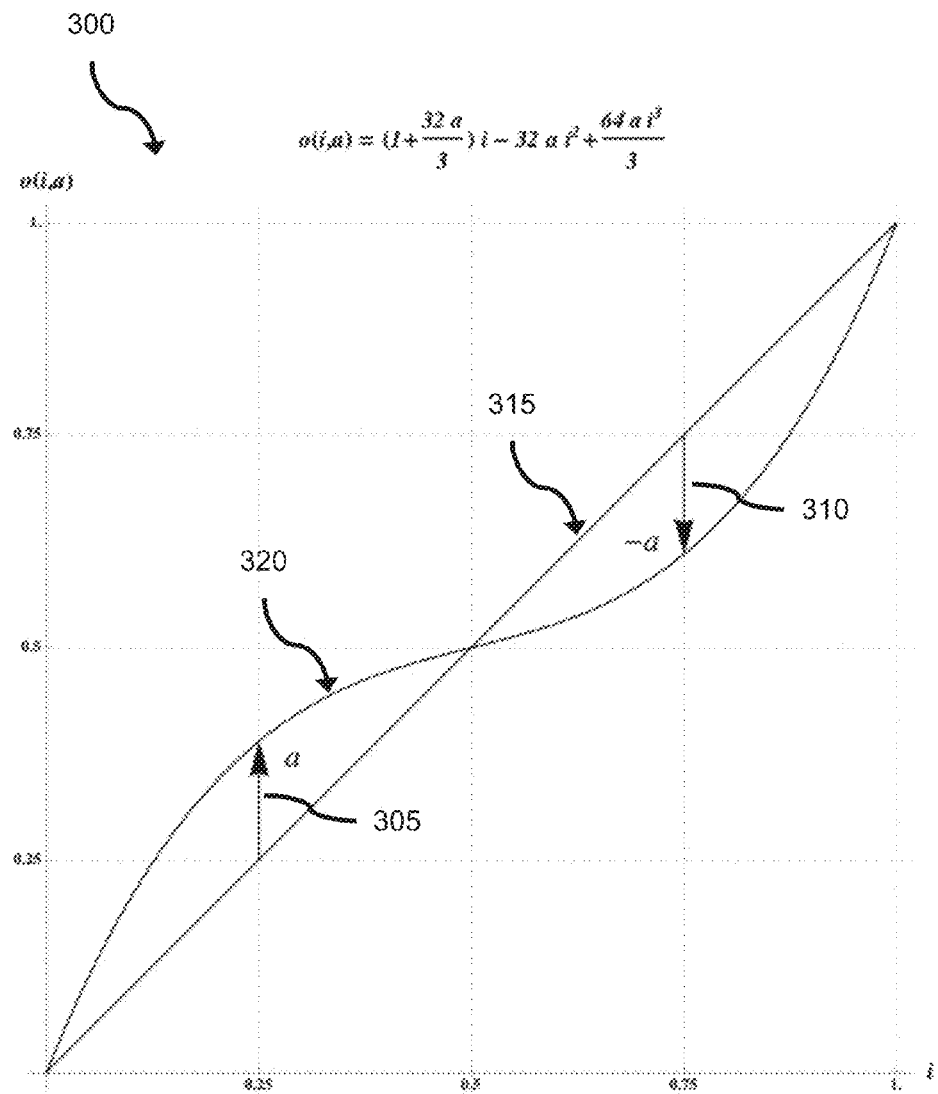
FIG. 3 is a graph of an adjustable contrast reduction curve as used in accordance with one or more aspects of an embodiment of the present disclosure.

FIG. 3 is a graph 300 of an adjustable contrast reduction function suitable for use as a tone equalization operator (125 and 225). The horizontal axis is the digital input value i, normalized to a range of 0 to 1. The vertical axis is the digital output value o(i,a), also normalized to a range of 0 to 1. The output value o(i,a) is a function of the digital input value i and a parameter a, which controls the degree of contrast reduction. In particular, the parameter a specifies the vertical displacements 305 and 310 of an identity curve 315 that occur at input values i=0.25 and i=0.75, respectively, to produce the contrast reduction curve 320. The mathematical form of the adjustable contrast reduction function is:

$$o(i,a)=(1+(32/3)a)i-32ai^2+(64/3)ai^3$$

for a>0. To appreciate that curve 320, when applied to a digital image, results in a reduction in contrast, consider the effect on input values less than 0.5 and greater than 0.5. Values less than 0.5, after application of curve 320, are all greater than their original values, that is, o(i,a)>i for i<0.5. For i>0.5, application of curve 320 results in o(i,a)<i. In both cases, input values i are transformed into values that are closer to midtone value 0.5, representing a decrease in contrast.

Figure 4B:
FIG. 4B illustrates a converted digital line drawing of the digital image of FIG. 4A by an embodiment of the present disclosure.
Figure 4A:
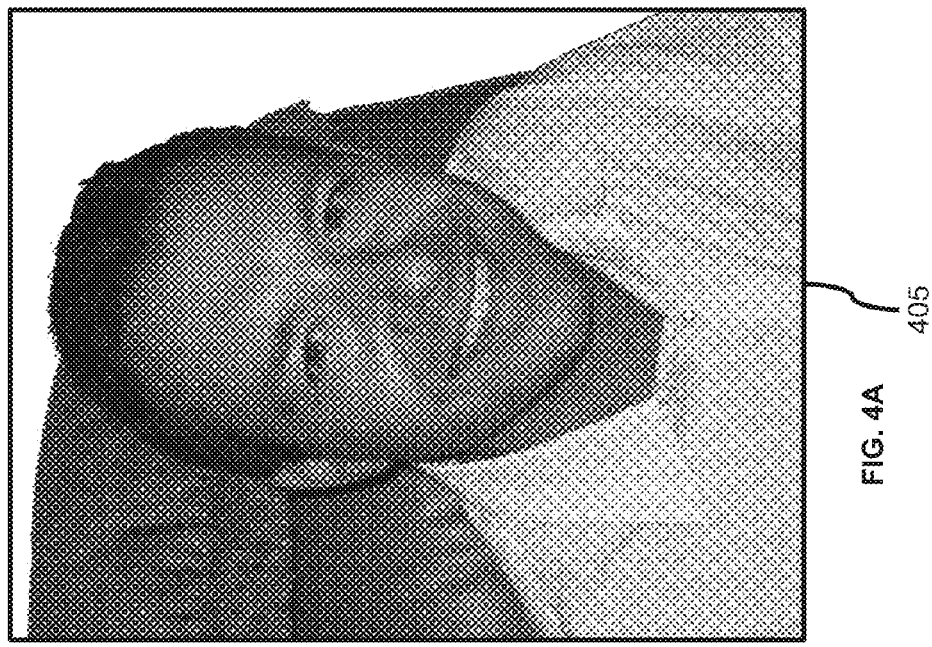
FIG. 4A illustrates an example of a digital image to be converted to a digital line drawing.

FIG. 4A illustrates an example digital image 405. FIG. 4B illustrates a digital line drawing 410 that can be generated from the digital image 405 according to the invention.

Figure 5:
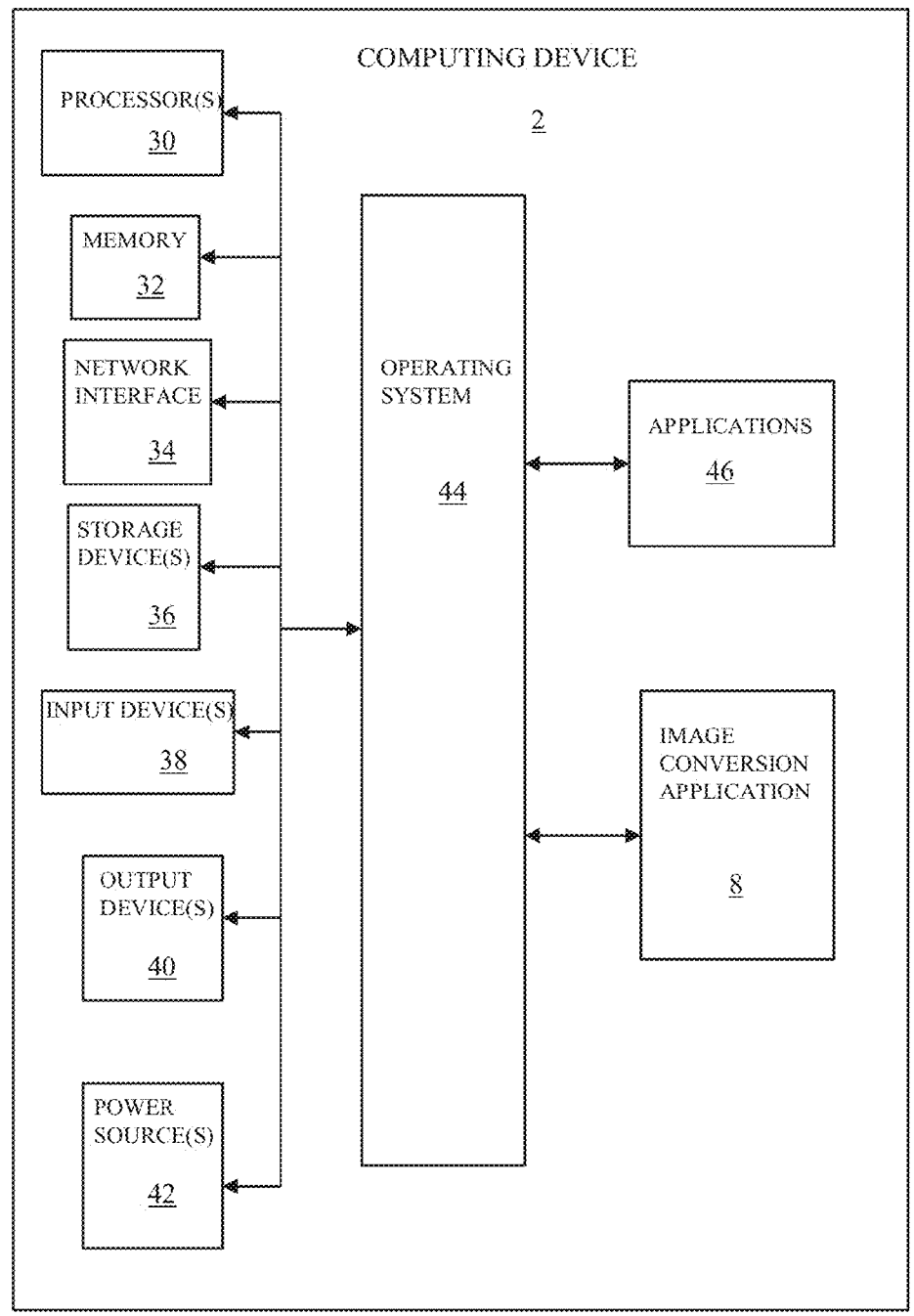
FIG. 5 is a block diagram that illustrates a computing device to execute one or more applications and receive a user input in accordance with one or more aspects of an embodiment of the present disclosure.

FIG. 5 is a block diagram illustrating details of one example of a computing device 2 that may execute one or more applications (e.g., image conversion application 8). FIG. 5 illustrates only one particular example of computing device 2, and many other example embodiments of computing device 2 may be used in other instances.

As shown in the specific example of FIG. 5, computing device 2 includes one or more processors 30, memory 32, a network interface 34, one or more storage devices 36, one or more input devices 38, one or more output devices 40, and one or more batteries or other power sources 42. Computing device 2 also includes an operating system 44 executable by computing device 2. Computing device 2 may include one or more applications 46 and image conversion application 8 executable by computing device 2. Each of components 30, 32, 34, 36, 38, 40, 42, 44, 46, and 8, may be interconnected (physically, communicatively, and/or operatively) for inter-component communications.

Processors 30 may be configured to implement functionality and/or process instructions for execution in computing device 2. Processors 30 may be capable of processing instructions stored in memory 32 or instructions stored on storage devices 36.

Memory 32 may be configured to store information within computing device 2 during operation. Memory 32 may, in some examples, be described as a non-transitory or tangible computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 46) to temporarily store information during program execution.

Storage devices 36 may also include one or more non-transitory or tangible computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as one or more wireless networks. Network interface 34 may be a network interface card, such as an Ethernet card, an optical transceiver, a radio frequency transceiver, or any other type of device that can send and receive information. Examples of such network interfaces may include Bluetooth®, 3G and WiFi®, radios in mobile computing devices as well as USB. Examples of such wireless networks may include WiFi®, Bluetooth®, and 3G. In some examples, computing device 2 may utilize network interface 34 to wirelessly communicate with an external device (not shown) such as a server, mobile phone, or other networked computing device.

Computing device 2 may also include one or more input devices 38. Input device 38 may be configured to receive input from a user through tactile, audio, or video input. Examples of input device 38 may include a touch-sensitive screen, mouse, a keyboard, a voice responsive system, video camera, or any other type of device for detecting a command from a user.

One or more output devices 40 may also be included in computing device 2. Output device 40 may be configured to provide output to a user using tactile, audio, or video output. Output device 40 may include a touch-sensitive screen, sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), a printer, or any other type of device that can provide output to a user.

Computing device 2 may include one or more batteries or power sources 42, which may be rechargeable and provide power to computing device 2. One or more power sources 42 may be a battery made from nickel-cadmium, lithium-ion, or any other suitable material. The one or more power sources 42 may be rechargeable and/or the device 2 can be powered via a power supply connection.

Computing device 2 may include operating system 44. Operating system 44 may control the operation of components of computing device 2. For example, operating system 44 may facilitate the interaction of application 46 or image conversion application 8 with processors 30, memory 32, network interface 34, storage device 36, input device 38, output device 40, and battery 42.

Any applications, e.g. application 46 or image conversion application 8, implemented within or executed by computing device 2 may be implemented or contained within, operable by, executed by, and/or be operatively/communicatively coupled to components of computing device 2, e.g., processors 30, memory 32, network interface 34, and/or storage devices 36.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory or tangible media. The term "non-transitory" may indicate that the storage medium is not embodied in a carrier wave or a propagated signal. In certain examples, a non-transitory storage medium may store data that can, over time, change (e.g., in RAM or cache).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of converting a digital image to a digital line drawing, the method comprising:
    forming a blank accumulator image with uniform pixel values from an input image;
    applying a smoothing operator to at least one channel image of the input image to form at least one smoothed image;
    applying a scaling operator to the at least one smoothed image to form at least one scaled image;
    applying a tone equalization operator to the at least one scaled image to form at least one equalized image;
    applying an edge detection operator to the at least one scaled image to form at least one edge image;
    applying a threshold operator to the at least one edge image to form at least one threshold image;
    combining the at least one threshold image with the blank accumulator image; and
    creating a digital line drawing with the combined at least one threshold image and the blank accumulator image.

2. The method of claim 1, further comprising:
    extracting the at least one channel image from the input image.

3. The method of claim 2, wherein the at least one channel image is part of a subset of channel images.

4. The method of claim 3, further comprising:
    determining if all of the channel images of the subset have been used in forming the at least one threshold image; and
    when it is determined that not all channel images in the subset have been used in forming the at least one threshold image, applying the smoothing operator to the channel images in the subset that have not been used at that point to form at least one additional smoothing image, applying a scaling operator to the at least one additional smoothed image to form at least one additional scaled image, applying a tone equalization operator to the at least one additional scaled image to form at least one additional equalized image, and applying an edge detection operator to the at least one additional scaled image to form at least one additional edge image.

5. The method of claim 3, wherein said subset of channel images is comprised of at least a red channel and a green channel.

6. The method of claim 1, further comprising:
adjusting the line weight of the digital line drawing.

7. The method of claim 1, further comprising:
combining a plurality of input image channels to form the at least one channel image.

8. The method of claim 1, wherein the input image is at least one of a grayscale image and an RGB image.

9. The method of claim 1, wherein applying the smoothing operator includes at least one of applying a blur filter and applying at least one iteration of an iteration median filter.

10. The method of claim 1, wherein applying the tone equalizer operator includes at least one of applying an adjustable contrast reduction curve, a histogram equalization, a contrast-limited adaptive histogram equalization and a local correction operator.

11. The method of claim 1, wherein applying the edge detector operator includes at least one of applying a Gaussians operator, a Sobel operator and a Canny edge detector.

12. The method of claim 1, wherein applying the threshold operator includes applying at least one of a fixed gray level threshold operator and an adaptive threshold operator.

13. The method of claim 12, wherein said adaptive threshold operator is a fixed pixel percentage threshold operator.

14. The method of claim 6, wherein adjusting the line weight of the digital line drawing further comprises:
applying at least one iteration of a morphological operator.

15. The method of claim 14, wherein the morphological operator is at least one of an erosion operator and a dilation operator.

16. The method of claim 7, wherein the formed at least one channel image from the plurality of input image channels is a luminance image.

17. A method for converting a digital image into a digital line drawing, comprising:
receiving an input image with a plurality of input channels,
forming a blank accumulator image from the input image with uniform pixel values;
for a subset of the plurality of input channels,
forming a single channel image from one of the input channels in the subset,
applying a smoothing operator to the single channel image to obtain a smoothed image,
applying a scaling operator to the smoothed image to obtain a scaled image,
applying a tone equalization operator to the scaled image to obtain an equalized image,
applying an edge detection operator to the equalized image to obtain an edge image,
applying a threshold operator to the edge image to obtain a thresholded image,
combining the thresholded image with the accumulator image, and
providing the accumulator image as the digital line drawing.

18. The method of claim 17, further comprising:
adjusting the line weight of the threshold image by applying at least one iteration of a morphological operator.

19. A method for converting a digital image into a digital line drawing, comprising:
receiving an input image with at least one channel;
forming a combination of at least one channel of the input image to obtain a single channel image;
applying a smoothing operator to the single channel image to obtain a smoothed image;
applying a scaling operator to the smoothed image to obtain a scaled image;
applying a tone equalization operator to the scaled image to obtain an equalized image;
applying an edge detection operator to the equalized image to obtain an edge image;
applying a threshold operator to the edge image to obtain a threshold image; and
combining the threshold image with a blank accumulator image of uniform pixel values formed from the input image to create the digital line drawing.

20. The method of claim 19, further comprising:
adjusting the line weight of the threshold image by applying at least one iteration of a morphological operator.

* * * * *